United States Patent [19]
Rodgers, Jr.

[11] Patent Number: 5,527,246

[45] Date of Patent: Jun. 18, 1996

[54] MOBILE EXERCISE APPARATUS

[76] Inventor: Robert E. Rodgers, Jr., 8011 Meadowcroft, Houston, Tex. 77063

[21] Appl. No.: 522,178

[22] Filed: Aug. 31, 1995

Related U.S. Application Data

[63] Continuation-in-part of Ser. No. 426,467, Apr. 19, 1995, which is a continuation-in-part of Ser. No. 377,846, Jan. 25, 1995.

[51] Int. Cl.⁶ .......................... A63B 22/00; B62K 21/18
[52] U.S. Cl. .......................... 482/57; 280/253; 280/257; 482/52
[58] Field of Search ................... 482/51–53, 57, 482/62, 70, 74, 71, 79–80, 92; 280/253, 255, 256, 257, 258

[56] References Cited

U.S. PATENT DOCUMENTS

| | | |
|---|---|---|
| 219,439 | 9/1879 | Blend . |
| 400,204 | 3/1889 | Golding .................. 280/253 |
| 1,273,906 | 5/1917 | Nickey .................... 280/257 |
| 1,577,585 | 3/1926 | Montiglio ................ 280/257 |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |

FOREIGN PATENT DOCUMENTS

| | | |
|---|---|---|
| 2919494 | 5/1979 | Germany . |

*Primary Examiner*—Stephen R. Crow
*Attorney, Agent, or Firm*—Pravel, Hewitt, Kimball & Krieger

[57] ABSTRACT

A mobile exercising apparatus which promotes cardiovascular exercise yet minimizes impact to critical joints. A frame supports a pair of reciprocating members which are displace generally horizontally along the frame at one end yet reciprocate in a circular motion at the other through a coupling system attached to the frame. Structure is included which permits each foot of the user to move in a generally elliptical path during exercise and drive a wheel thereby propelling the apparatus. This allows simulation of walking or running without impact. The device may include linkage to facilitate a corresponding upper body exercise involving movement of the arm in which case each hand of the user is displaced along an arcuate path.

10 Claims, 3 Drawing Sheets

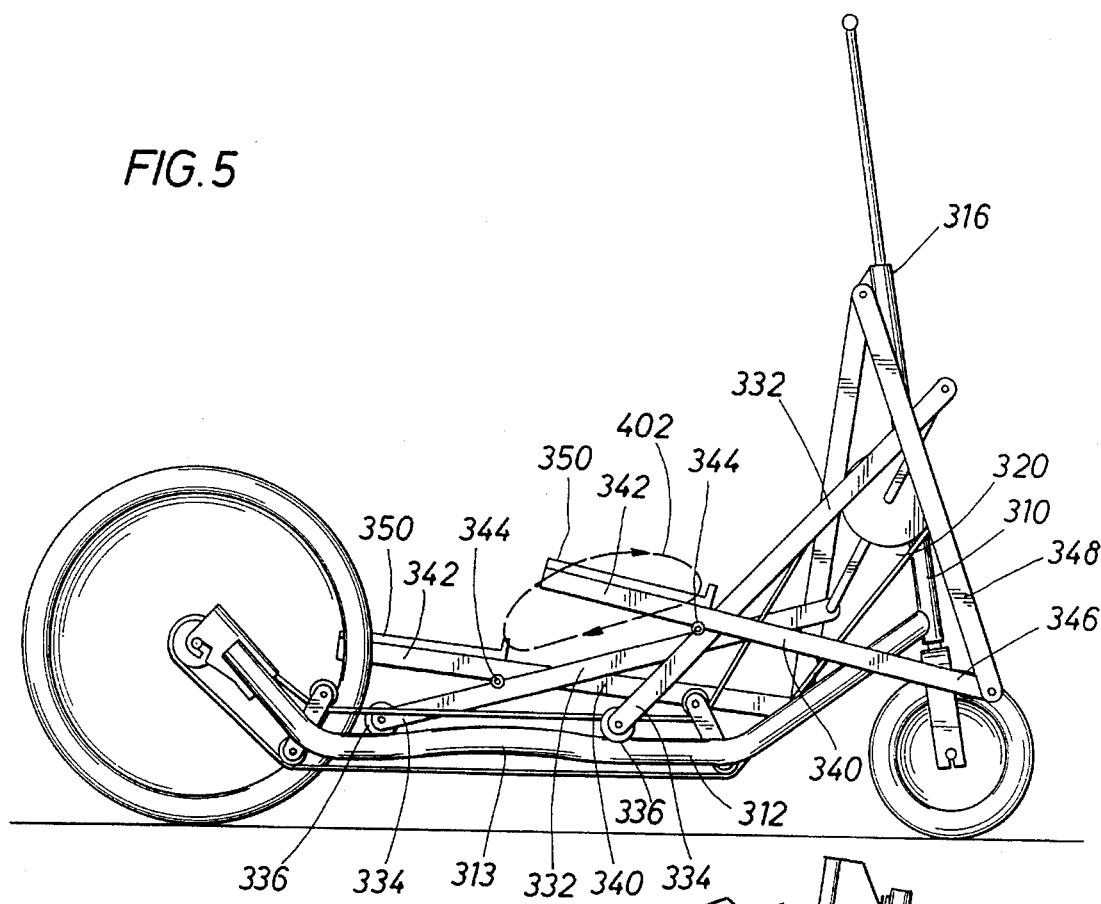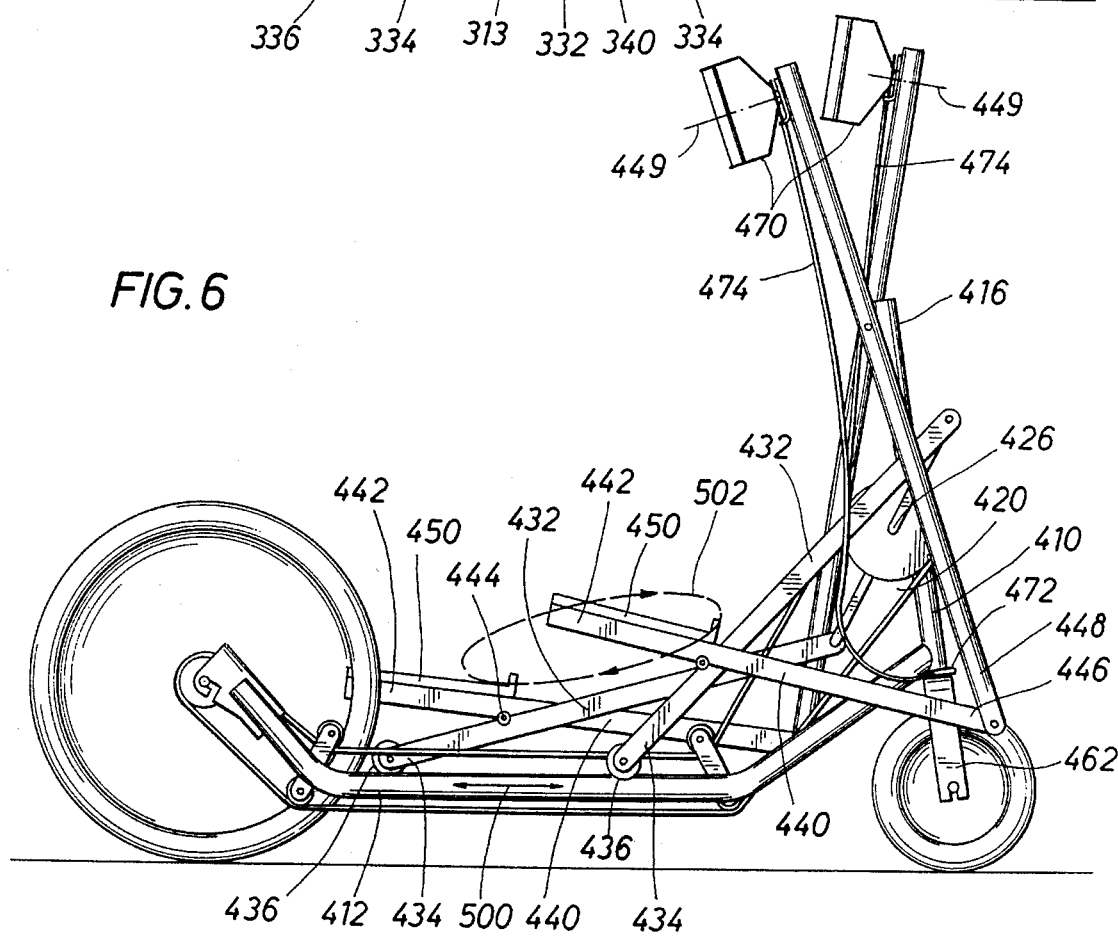

MOBILE EXERCISE APPARATUS

RELATED APPLICATION

This patent application is a continuation-in-part of pending U.S. patent application Ser. No. 08/426,467, filed Apr. 19, 1995, which is a continuation-in-part of pending U.S. patent application Ser. No. 08/377,846, filed Jan. 25, 1995.

BACKGROUND OF THE INVENTION

1. Field of the Invention

The present invention relates to a human powered mobile exercise device. More particular, the invention enables the user to move his feet in an ovate or near elliptic pattern driving at least one wheel of a mobile exercise apparatus.

2. Description of the Prior Art

Running has long been a popular form of exercise. However, many cannot tolerate the impact loading that occurs on heel strike with the ground. Therefore, the need exists for a mobile exercise device which simulates the motion and feel of running without the impact.

Prior art human powered mobile exercise devices do not allow the user to move through a natural pattern that simulates running. These devices force the user to move his legs primarily through a vertical pumping motion such as in stair climbing and do not simulate the foot motion of running. See, for example, U.S. Pat. Nos. 4,053,173; 4,379,566; and 4,456,276.

While prior art stationary exercise devices exist which do allow an ovate or near elliptic foot motion (see, for example, U.S. Pat. Nos. 5,242,343; 5,299,993; 5,383,829; and 5,423,729), such devices cannot be readily modified to accommodate human powered mobile exercise because of their inherent length and mechanical configuration. Further, prior art stationary exercise devices do not allow control of foot pedal angle during the ovate or near elliptic foot motion.

Hence, the need exists for a mobile exercise apparatus which provides the physical benefits of running without impact.

SUMMARY OF THE INVENTION

Briefly, the invention relates to a human powered running machine. A frame is provided which includes a base portion and a top portion. The base portion is supported by at least two wheels. A coupling member is attached to the frame which includes a sprocket defining a pivot axis. Two reciprocating members are positioned in spaced relationship to the base portion of the frame. One end of each reciprocating member is adapted for linear movement substantially parallel with the floor. The end of each of the reciprocating members being linearly displaced contacts the base portion of the frame. The other end of each reciprocating member is attached, directly or indirectly, to the sprocket of the coupling member. In this manner, rotation of the sprocket rotates one end of each reciprocating member in a circular motion while the other end of each reciprocating moves in a substantially linear manner. Means are also included for rotatably engaging the sprocket of the coupling member with at least one wheel of the frame. This translates the rotational energy of the sprocket to at least one of the wheels to propel the frame forward.

Means are also included for orienting the bottom of the feet of the user so that each foot follows an ovate or near elliptic path during the operation of the apparatus. Such orienting means may include a linkage assembly for each reciprocating member. Each such linkage assembly comprises at least one link which is pivotally connected proximal one end between the two ends of a corresponding reciprocating member, closest to that end of the reciprocating member which is being displaced along the frame. In the preferred embodiment, each linkage assembly includes a second link which is pivotally connected to the second end of the first link. The second link is then pivotally restrained to the top portion of the frame proximate its other end.

In an alternate embodiment, each linkage assembly includes a single foot member. One end of each foot member is pivotally connected to a corresponding reciprocating member, closest to that end of the reciprocating member being displaced along the frame and the other end of each foot member consists of a camming surface which engages a roller fixed to the frame. The camming surface serves to control foot pedal angle.

In another alternate embodiment, one end of each foot member is pivotally connected to a corresponding reciprocating member, closest to that end of the reciprocating member being displaced along the frame, and the other end is restrained within a track which may be straight or curved and which is attached to the frame.

In yet another alternate embodiment, the base portion of the frame includes a curved section which acts as a camming surface to control the shape of the ovate foot path by influencing the lateral movement of the roller and of each reciprocating member.

In yet a further alternate embodiment, each linkage assembly includes a first and second link. Each such link is pivotally connected proximal one end between the two ends of a corresponding reciprocating member, closest to that end of the reciprocating member which is being displaced along the frame. Each such second link is pivotally connected to the second end of the first link, and each such second link is then pivotally restrained to the top portion of the frame proximate its other end. However, the second end of each second link also includes a handle portion which is to be grabbed by the user and oscillated in a backward/forward motion.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

FIG. 5 is an elevation view of yet another alternate embodiment of the present invention.

FIG. 6 is an elevation view of yet a further alternate embodiment of the present invention.

DETAILED DESCRIPTION OF PRESENT INVENTION

Figure 1:
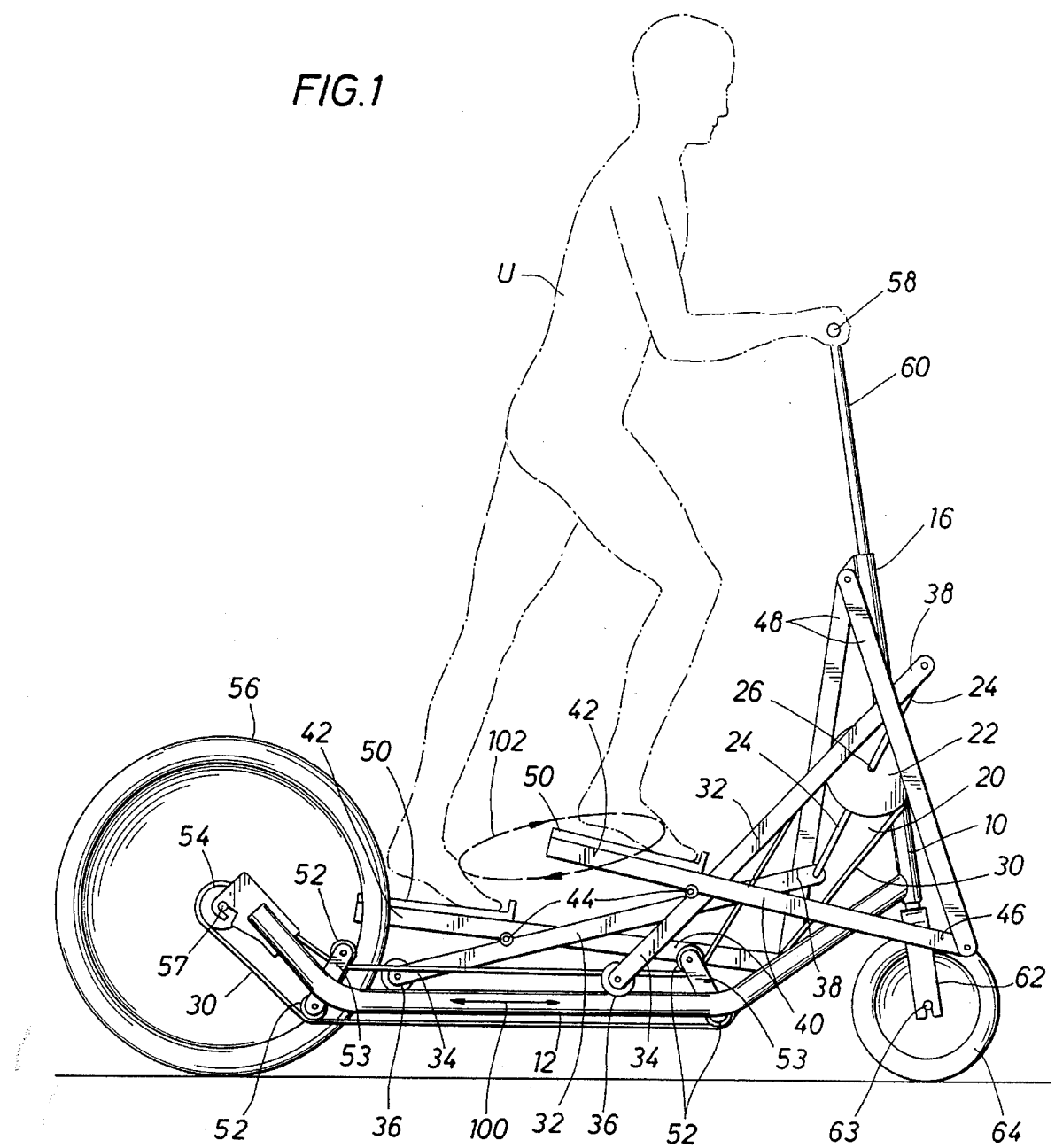
FIG. 1 is an elevation view of the preferred embodiment of the present invention.
Figure 2:
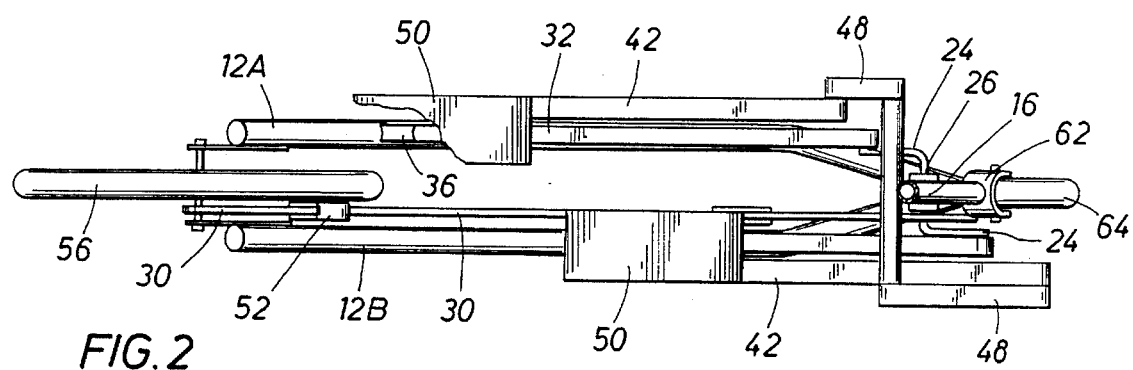
FIG. 2 is a plan view of the preferred embodiment of the present invention.

Referring to FIGS. 1 and 2, a frame 10 is shown comprising a base portion 12 and a top portion 14. Referring briefly to FIG. 2, the frame 10 comprises two bottom portions 12a and 12b. In essence, the lower portion of the frame is comprised of two separate bents "a" and "b". Obviously, variations can be made to frame 10 as disclosed without departing from the spirit of the invention. A coupling system 20 is fixed relative to the frame and comprises a sprocket 22, crank members 24, and chain 30. Two reciprocating members 32 are positioned in the lower proximity of frame 10. Each reciprocating member 32 has one end 34 which is adapted to move laterally in a substantially linear direction as shown in FIG. 1 by arrow 100. A roller 36 is mounted at each end 34 of each reciprocating member 32 and is adapted, as shown in FIG. 1, to ride on base portion 12 of frame 10. The other end 38 of each reciprocating member 32 is pivotally connected to one end of a crank 24. The other end of each crank 24 is attached to sprocket 22 at the pivot axis 26 of coupling system 20. The pivot axis 26 is the axis about which sprocket 22 rotates. Chain 30 is routed toward the rear of base portion 12 of frame 10 by idler gears 52 attached to base portion 12 by base 53.

The frame is supported by at least two wheels 56 and 64. Rear wheel 56 includes a sprocket 54 which is fixed to an axle 57 that is secured to the rear of base portion 12. Front wheel 64 includes an axle 63 which is secured to a fork 62. Fork 62 is attached to a rotatable steering tube 60 which passes through top portion 16. Handlebar 58 is attached to steering tube 60. Referring still to FIG. 1, chain 30 is routed past idler gears 52 and circumscribes rear sprocket 54.

In the preferred embodiment, the present invention also includes two foot members, or contact members, 40. Each foot member 40 is pivotally attached proximate a first end 42 through a pinned connection 44 to the reciprocating arm 32. A foot pad 50 is attached to the top surface of each foot member 40 at its first end 42. Each foot member 40 is pivotally attached at its other end 46 to a positioning member 48. Each positioning member 48 is also pivotally attached proximal its other end to the top portion 16 of frame 10. Referring to FIG. 2, it can be easily seen that frame 10 comprises dual base portions 12a/12b. Furthermore, it can be seen that reciprocating members 32, foot members 40, and positioning members 48 provide identical dual systems; each system resting on a base portion 12a or 12b of the frame and each arranged to accommodate one foot of the user.

In the operation of the preferred embodiment, the user "U" places his right foot on the right pedal and pushes off with his left foot at which time he places his left foot on the pedal. The User then commences an elliptic or an ovate motion of his feet as in running or walking. This motion results in the displacement of first ends 34 of each reciprocating member 32 in the direction of arrow 100. Similarly, a circulating motion occurs at the second end 38 of each reciprocating member 32 about pivot axis 26. However, at points between the opposite ends 34 and 38 of each reciprocating member 32, the motion gradually changes from a circular motion (at ends 38) to a linear motion at the ends 34. This geometric transition occurs in the form of an ovate or near elliptic path 102. Pinned connection 44 and foot pad 50 move through the above described ovate path. Foot member end 46 moves through an arcuate path defined by the reciprocating arcuate motion of positioning member 48 thereby controlling the angle of foot member 40 and foot pad 50. Rotation of crank 24 and drive sprocket 22 causes chain 30 to drive rear sprocket 54 and rear wheel 56 thus propelling the apparatus forward.

Those skilled in the art will appreciate that traditional bicycle planetary or derailleur gear shift systems are easily adapted to the running machine. Although the figures show this embodiment with two wheels, those skilled in the art will recognize that three or four wheels can be utilized in either a tricycle or quadracycle configuration.

Figure 3:
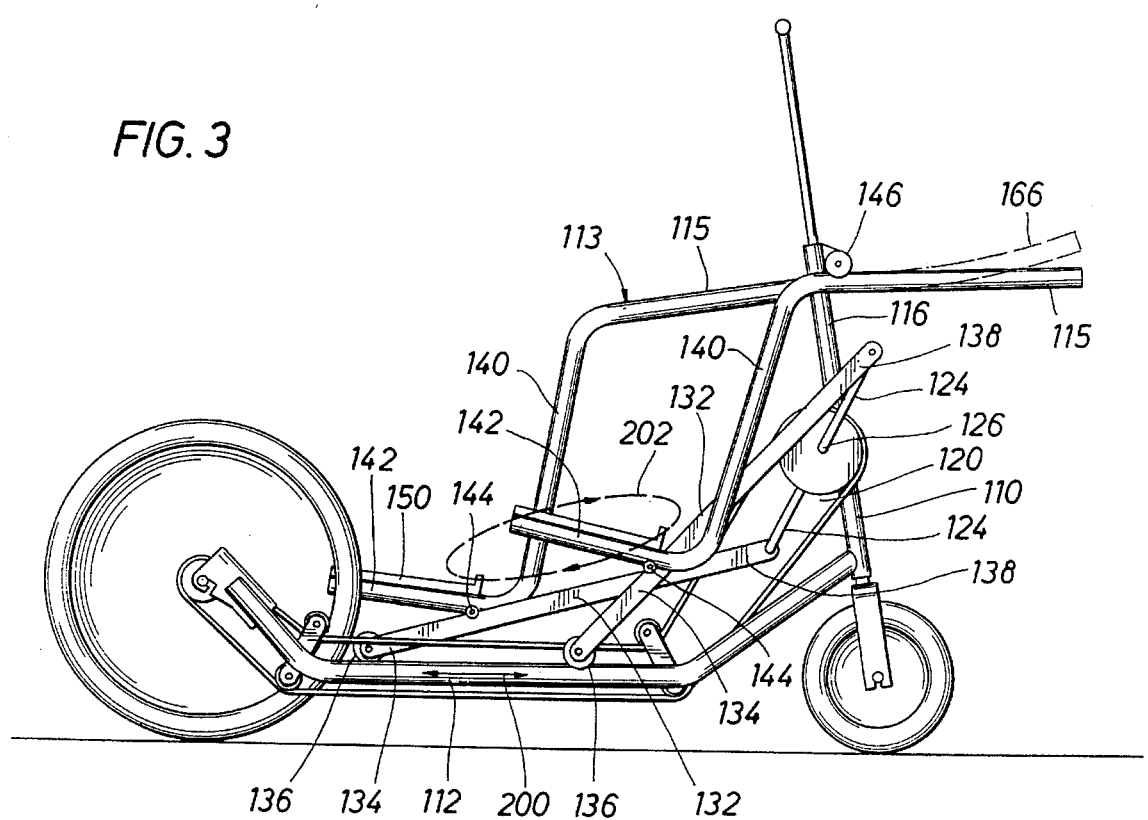
FIG. 3 is an elevation view of an alternate embodiment of the present invention.

Referring now to FIG. 3, an alternate embodiment of the present invention is shown. For this embodiment, identical two-digit reference numerals will be used to designate similar structure found in the preferred embodiment but with a 100 series prefix. Frame 110 again comprises a base portion 112 and a top portion 116. A coupler system 120 is also provided which is identical in structure and function to coupling system 20 of the preferred embodiment (FIGS. 1–2). This alternate embodiment also includes a pair of reciprocating members 132, each having a first end 134 which moves linearly in the direction of arrow 200 by means of rollers 136. Each reciprocating member 132 includes a second end 138 pivotally attached to one end of a crank 124. In this alternate embodiment, two foot members 140 are included having a foot portion 150. Each foot member 140 is pivotally connected at a pinned connection 144 proximate first end 142 of a foot member 140 to a corresponding reciprocating member 132. The forward and upper portion 113 of the foot member 140 comprises a camming portion 115 which may be curved as shown by phantom lines 166. A roller 146, which is secured to upper frame 116, engages the upper surface of the camming portion 115 of the foot member 140 during the operation of the present invention. Thus, each roller 146 serves to vertically restrain the camming portion 115 of each member 140.

In the operation of this alternate embodiment, the user initiates an ovate or near elliptic motion of his feet. This foot motion causes the ends 134 of each reciprocating member to move in a linear motion in the direction of arrow 200 while ends 138 of each reciprocating member 132 move in a circular motion about pivot axis 126. Pinned connection 144 and foot pad 150 move through an ovate or near elliptic path 202, and the angle of the foot pad 150 is controlled by the camming surface 115 engaging roller 146. The profile of the camming surface 115 is selected so as to achieve desired foot pad angles.

Figure 4:
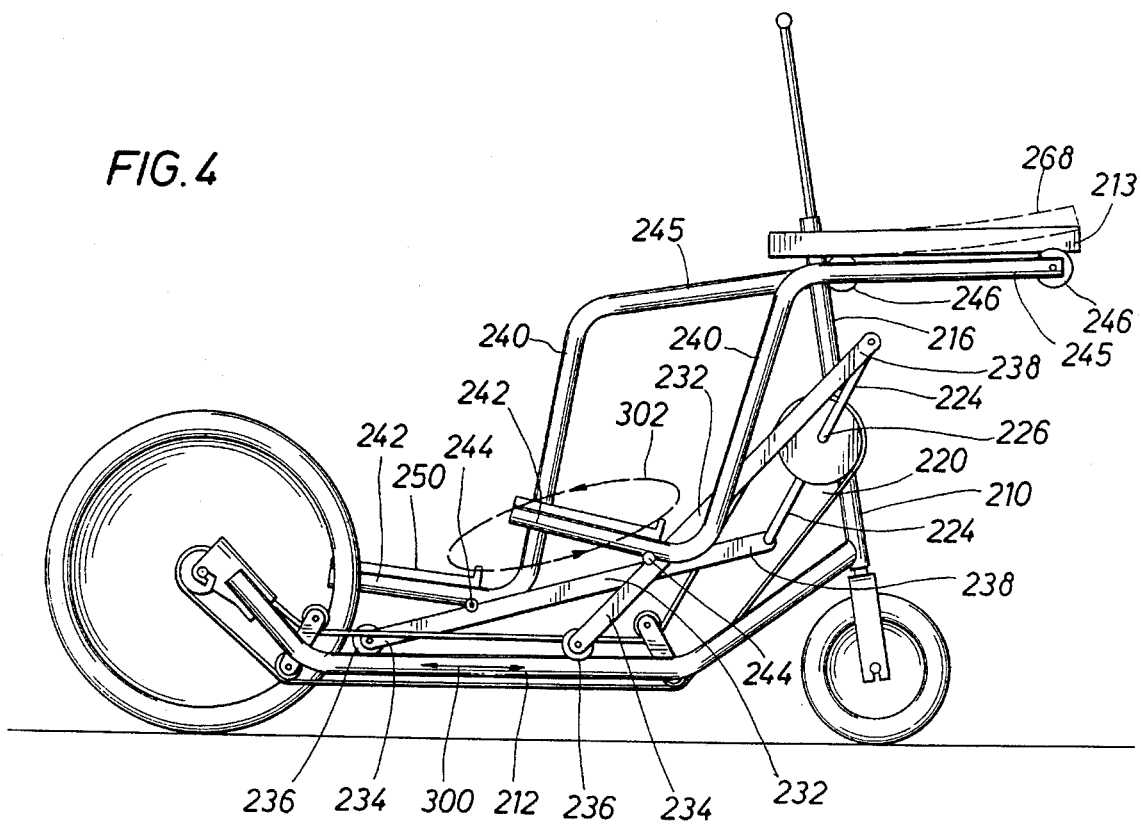
FIG. 4 is an elevation view of another alternate embodiment of the present invention.

Referring now to FIG. 4, another alternate embodiment of the present invention is shown. As before, similar parts will be designated by the same two-digit reference numeral as shown in the preferred embodiment but now with a 200 series prefix. Frame 210 comprises a lower portion 212 and a top portion 216. A coupling system 220 is included having identical components of the coupling system 20 described above for the preferred embodiment. Further, coupling system 220 performs in an identical manner to coupling system 20 described above for the preferred embodiment.

A pair of reciprocating members 232 are also included, each having a first end 234 on which rollers 236 are mounted. The second end 238 of each reciprocating member 232 is pivotally connected to one end of each crank 224. Two foot members 240 are included in this alternate embodiment, each being pivotally connected proximate first end 242 at a pinned connection 244 to a corresponding reciprocating member 232. Each foot member 240 also includes a foot pad 250 attached to the top surface of each foot member 240 at first end 242. In this embodiment, a roller 246 is attached to each foot member 240 at its second end 245.

Each roller 246 engages a track 213 which may be curved as shown by phantom lines 268. Track 213 is attached to top portion 216 of the frame. Thus, each track 213 guides the second end 245 of each foot member 240 by means of roller 246.

In the operation of this alternate embodiment, the user initiates an ovate or near elliptic motion 302 of his feet. This foot motion causes ends 234 of each reciprocating member 232 to move in a linear motion in the direction of arrow 300 and ends 238 of each reciprocating member 232 move in a circular motion about pivot axis 226. Pinned connection 144 and foot pad 150 move through an ovate or near elliptic path, and the angle of the foot pad 150 is controlled by the roller 246 which engages track 213. The profile of track 213 is selected so as to achieve the desired foot pad angles.

Referring now to FIG. 5, yet another alternate embodiment of the present invention is shown. As before, similar parts will be designated by the same two-digit reference numeral as shown in the preferred embodiment but now with a 300 series prefix. Frame 310 again comprises a base portion 312 and a top portion 316. In this alternate embodiment, a portion of base portion 312 includes a curved profile 313 proximate that portion of the base in contact with rollers 336 of reciprocating members 332. A coupling system 320 is including having identical components of the coupling system 20 described above for the preferred embodiment. Further, coupling system 320 performs in an identical manner to coupling system 20 described above for the preferred embodiment. Each reciprocating member 332 has one end 334 which is adapted to move laterally. A roller 336 is mounted at each end 334 of each reciprocating member 332 and is adapted, as shown in FIG. 6, to ride on curved profile 313 of base portion 312 of frame 310.

This alternate embodiment also includes two foot members, or contact members, 340. Each foot member 340 is pivotally attached proximate a first end 342 through a pinned connection 344 to each reciprocating arm 332. A foot pad 350 is attached to the top surface of each foot member 340 at its first end 342. Each foot member 340 is pivotally attached at its other end 346 to positioning member 348. Each positioning member 348 is also pivotally attached proximal its other end to top portion 316 of frame 310.

In the operation of this alternate embodiment, the user's feet move in a predetermined closed ovate path 402. The curved portion 313 of each base portion 312 acts as a camming surface and influences the profile of the closed path 402. In FIG. 6, the profile of the curved portion 313 serves to flatten the lower portion of path 402 which more accurately simulates a low speed walking motion. Different profiles for the curved portion 313 may be utilized to best simulate other walking or running speeds.

Referring now to FIG. 6, yet a further alternate embodiment of the present invention is shown. As before, similar parts will be designated by the same two-digit reference numeral as shown in the preferred embodiment but now with a 400 series prefix. Frame 410 again comprises a base portion 412 and a top portion 416. A coupling system 420 is included having identical components of the coupling system 420 described above for the preferred embodiment. Further, coupling system 420 performs in an identical manner to coupling system 420 described above for the preferred embodiment. Each reciprocating member 432 has one end 434 which is adapted to move laterally. A roller 436 is mounted at each end 434 of reciprocating member 432 and is adapted to ride on base portion 412 of frame 410.

This alternate embodiment also includes two foot members, or contact members, 440. Each foot member 440 is pivotally attached proximate a first end 442 through a pinned connection 444 at the reciprocating arm 432. A foot pad 450 is attached to the top surface of each foot member 440 at its first end 442. Each foot member 440 is pivotally attached at its other end 446 to arm member 448. Each arm member 448 is pivotally attached proximal its mid-point to the top portion 416 of frame 410. Handles 470 are pivotally coupled to arm members 448 so that the handles can rotate about axes 449. Shrouded cables 474 mechanically couple handles 470 to fork 462 through bellcrank 472. Therefore, as the handles are rotated about axes 449 by the user, the front fork is forced to rotate and steering is effected.

In the operation of this alternate embodiment, the user initiates an ovate or near elliptic motion of his feet. This foot motion causes the ends 434 of each reciprocating member to move in a linear motion in the direction of arrow 500 and ends 438 of each reciprocating member 432 move in a circular motion about pivot axes 426. Pinned connection 444 and foot pad 450 move through an ovate or near elliptic path 502. End 446 of each foot member 440 moves through an arcuate path defined by the reciprocating arcuate motion of arm member 448 thereby controlling the angle of foot member 440 and foot pad 450. The upper end of arm members 448 and handles 470 also move in an arcuate pattern. The user may simultaneously exercise his upper body by pushing and pulling on the handles 470.

Obviously, modifications and alterations to the preferred embodiment disclosed herein will be apparent to those skilled in the art in view of this disclosure. However, it is intended that all such variations and modifications fall within the spirit and scope of this invention as claimed.

What is claimed is:

1. A mobile exercising apparatus comprising:

a frame having a top portion and a base portion and at least two wheels;

a pair of pivotal linkage assemblies, each linkage assembly having at least a first end and a second end, a portion of each said linkage assembly adapted for substantially linear movement along said base portion of said frame and includes means for supporting each foot of the user;

a coupling assembly supported within said frame and pivotally connected to said second end of each linkage assembly; and means for rotatably engaging said coupling assembly with at least one of said wheels, wherein pivotal movement of said linkage assemblies revolves each foot of the user in a substantially elliptical path and enables said rotating means to initiate rotation of at least one of said wheels.

2. The mobile exercising apparatus according to claim 1 wherein:

said coupling assembly comprises a sprocket defining a pivot axis and means for attaching said second end of each linkage assembly to said sprocket so that rotation of said sprocket results in the rotation of said second end of each such linkage assembly in a substantially circular path about said pivot axis; and said rotating means comprises a second sprocket in fixed rotational engagement with at least one of said wheels and chain means for rotatably engaging said sprocket of said coupling assembly with said second sprocket.

3. The mobile exercising apparatus according to claim 1 wherein said top portion of said frame comprises a handle portion and at least one of said wheels, enabling the user to steer said mobile exercising apparatus.

4. A mobile exercising apparatus comprising:

a frame having a top portion and a base portion and at least two wheels;

first and second reciprocating members, each reciprocating member having a first end and a second end, said first end of said first and second reciprocating members adapted for linear motion substantially parallel with said base portion;

a coupling member having (i) a sprocket supported by said frame defining a pivot axis, and (ii) means for attaching said second ends of said first and second reciprocating members to said sprocket so that rotation of said sprocket results in the rotation of said second ends of said first and second reciprocating members in a substantially circular path about said pivot axis;

means for rotatably engaging said sprocket with at least one of said wheels; and first and second pivotal linkage assemblies for orienting the bottom of the foot of the user of the apparatus so that each foot follows a substantially elliptical path during operation of the apparatus.

5. The mobile exercising apparatus according to claim 4 wherein said coupler member attaching means comprises:

a first element attached at one end to said sprocket proximate said pivot axis and at its other end to said second end of said first reciprocating member; and a second element attached at one end to said sprocket proximate said pivot axis and at its other end to said second end of said second reciprocating member.

6. The mobile exercising apparatus according to claim 4 wherein said top portion of said frame further comprises a handle portion and at least one of said wheels, enabling the user to steer said mobile exercising apparatus.

7. The mobile exercising apparatus according to claim 4 wherein:

said first linkage assembly being pivotally connected proximate one end between the first and second ends of said first reciprocating member proximate said first end of said first reciprocating member, and second linkage assembly being pivotally connected proximate one end between the first and second ends of said second reciprocating member proximate said first end of said second reciprocating member, each linkage assembly being pivotally attached at its other end to said frame distally from said coupling member; and said first and second linkage assemblies having a handle portion proximate said pivotal connection to said frame so that the user of said apparatus may grip the handle portions during use of the apparatus enabling a substantially arcuate movement of said handle portions.

8. The mobile exercising apparatus according to claim 4 wherein:

said first linkage assembly comprises a first link and a second link, one end of said first link of said first linkage assembly being pivotally attached proximate said one end between said first and second ends of said first reciprocating member, and said second link of said first linkage assembly being pivotally connected at one end to the other end of said first link and pivotally connected proximate the other end of said second link to said frame; and a second linkage assembly comprises a first link and a second link, one end of said first link of said second linkage assembly being pivotally attached proximate said one end between said first and second ends of said second reciprocating member, and said second link of said second linkage assembly being pivotally connected at one end to the other end of said first link and pivotally connected proximate the other end of said second link to said frame;

said second links of said first linkage assembly and said second linkage assembly having a handle portion proximate said other end so that the user of said apparatus may grip the handle portions during use of the apparatus enabling a substantially arcuate movement of said handle portions.

9. A mobile exercising apparatus comprising:

a frame having at least two wheels;

a first linkage assembly having:
  (i) a first reciprocating member, and
  (ii) a first foot member, said first reciprocating member having a first end and a second end, said first end of said first reciprocating member being adapted for substantially linear movement along said frame;

a second linkage assembly having:
  (i) a second reciprocating member, and
  (ii) a second foot member, said second reciprocating member having a first end and a second end, said first end of said second reciprocating member being adapted for substantially linear movement along said frame; and a coupling member having:
  (i) a sprocket supported by said frame defining a pivot axis; and
  (ii) means for attaching said second ends of said first and second reciprocating members to said sprocket so that rotation of said sprocket results in the rotation of said second ends of said reciprocating members in a substantially circular path about said axis, said first foot member being pivotally connected proximal one end between said first and second ends of said first reciprocating member, and having a camming portion proximate said second end of said first foot member and adapted to engage said frame, said second foot member being pivotally connected proximal one end between said first and second ends of said second reciprocating member, and having a camming portion proximate said second end of said second foot member and adapted to engage said frame, wherein each foot of the user of the device follows a predetermined closed path having a preferred anatomical pattern.

10. The mobile exercising apparatus according to claim 9 wherein said top portion of said frame comprises a handle portion and at least one of said wheels, enabling the user to steer said mobile exercising apparatus.

* * * * *